No. 612,138. Patented Oct. 11, 1898.
A. G. REEVE.
CHAIN.
(Application filed Mar. 22, 1898.)
(No Model.)
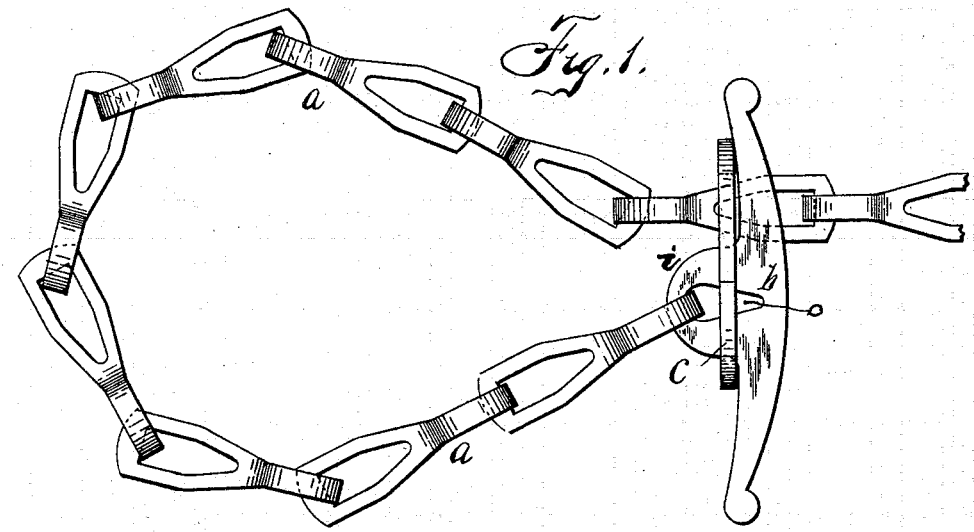
Fig. 1.
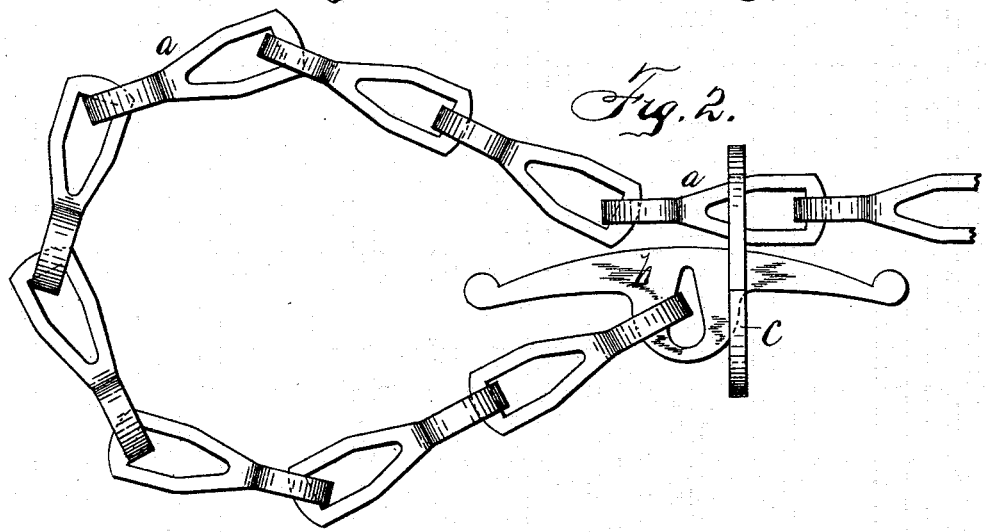
Fig. 2.
Fig. 4. Fig. 3.
 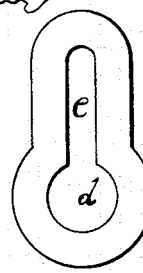
WITNESSES:
C. C. Schoeneck
Mary A. Franklin
INVENTOR
Amos G. Reeve
BY
Smith & Denison
ATTORNEYS.
THE NORRIS PETERS CO., PHOTO-LITHO., WASHINGTON, D. C.

UNITED STATES PATENT OFFICE.

AMOS G. REEVE, OF NIAGARA FALLS, NEW YORK, ASSIGNOR TO THE ONEIDA COMMUNITY, LIMITED, OF KENWOOD, NEW YORK.

CHAIN.

SPECIFICATION forming part of Letters Patent No. 612,138, dated October 11, 1898.

Application filed March 22, 1898. Serial No. 674,808. (No model.)

*To all whom it may concern:*

Be it known that I, AMOS G. REEVE, of Niagara Falls, in the county of Niagara, in the State of New York, have invented new and useful Improvements in Chains, of which the following, taken in connection with the accompanying drawings, is a full, clear, and exact description.

This invention relates to improvements in chains, having more particular reference to a sliding link on the chain, by which I am enabled to form a fixed loop, as distinguished from a sliding loop or noose.

My object is to construct such a sliding ring to be placed upon chains that will enable me to form a loop that will not slip. This is particularly desirable in halter-chains or in other chains where a fixed loop is desirable; and to that end my invention consists in constructing a sliding ring having an opening in one end merging into a slotway or from which a slotway diverges and which will grip and firmly hold the chain at any particular link by inserting one end of it edgewise into the slotway and inserting the other end of the chain into the opening in the ring, so as to hold the link in the slotway and prevent its being withdrawn therefrom; and to that end my invention consists in the several new and novel features of construction and operation hereinafter described, and which are specifically set forth in the claims hereunto annexed.

It is constructed as follows, reference being had to the accompanying drawings, in which—

Figure 1 is a side view of a chain having a loop formed thereof by means of my improved ring. Fig. 2 is a similar view showing the handpiece in the act of passing through the opening in the ring. Fig. 3 is a plan view of the ring detached. Fig. 4 is a view of a ring constructed from a piece of wire.

$a$ are the links which constitute the chain and are the ordinary sheet-metal links making a chain of that construction, the links being formed by doubling the blank forming the same upon itself, and are thicker at one end than at the opposite end upon a line at right angles thereto.

A T or end piece $b$ is attached to one end of the chain, and this T has formed at the center of its inner edge an extension or enlargement $i$, and through the T and this enlargement is formed the slot $o$, which extends at right angles to the T, as shown, so that it can be freely turned at right angles, as shown in Fig. 2, when passing through the link $c$. The enlargement on the T is made just sufficiently wide to fit that portion of the slot $e$ in the sliding link that is not filled by the link of the chain, and hence this enlargement upon the T prevents any lateral movement of the link after it is adjusted in position.

$c$ is the chain-link, comprising an elongated piece of metal having an opening $d$ in one end and opening into a slotway $e$, extending to a point adjacent to the opposite end. The slotway $e$ is preferably of a uniform width throughout and less than the breadth of the opening $d$. I do not, however, limit myself to the construction of this link from a piece of sheet metal, as it will be evident that it may be cast or it may be constructed from a piece of wire, as shown in Fig. 4.

When at rest, the link is confined upon the chain by the handpiece at one end and a snap (not shown) at the other end.

When I desire to form a fixed loop, I pass one end of the link edgewise into the slotway, preferably the forward end, although this is not absolutely necessary, as the other end may be used just as effectually. I then pass the end of the chain having the handpiece through the opening $d$, as shown in Fig. 2, and allow it to take the position shown in Fig. 1. It will thus be observed that the end of the chain fills up the opening $d$ and prevents the link which is in engagement with the slotway from working out.

It will be observed that this link may be used with wire or other chains.

Having described my invention, what I claim, and desire to secure by Letters Patent, is—

1. A chain provided with a T which has the central portion of its inner edge adapted to fit in the sliding link, combined with the sliding link which is adapted to fit over one of the links of the chain and the central portion of the T, substantially as shown.

2. A chain composed of links which are thicker at one end than at the other, and which is provided with a T upon one end, and which T has a slot extending at right angles to its length, and in which one of the links of the chain catches; the T being also provided with an enlargement at the center of its inner side, combined with the sliding link having a longitudinal slot or opening made therethrough, the slot being larger at one end than at the other so as to allow the thickened end of the link to pass through, substantially as set forth.

In witness whereof I have hereunto set my hand this 18th day of March, 1898.

AMOS G. REEVE.

In presence of—
P. B. NOYES,
E. DEMING SMITH.